July 20, 1965
H. A. G. PASTERNACK
3,195,928
COUPLING FOR PIPES AND THE LIKE
Filed July 5, 1962
2 Sheets-Sheet 1
FIG.1
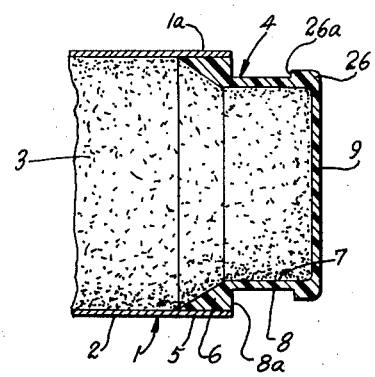
FIG.3
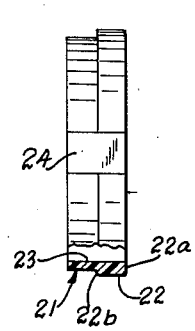
FIG.2
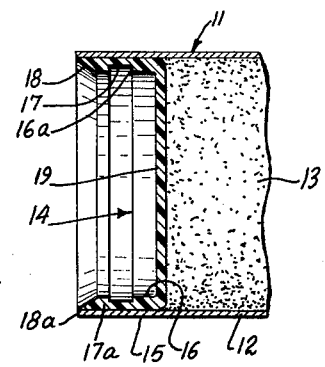
FIG. 4
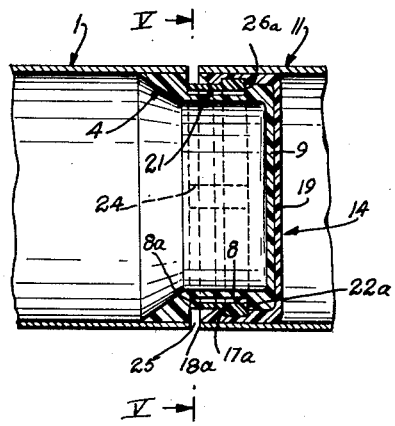
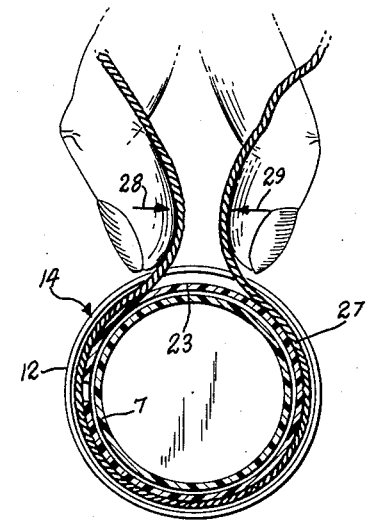
FIG. 5
INVENTOR
HORST A.G. PASTERNACK
BY
Michael J. Striker
ATTORNEY July 20, 1965 H. A. G. PASTERNACK 3,195,928
COUPLING FOR PIPES AND THE LIKE
Filed July 5, 1962 2 Sheets-Sheet 2
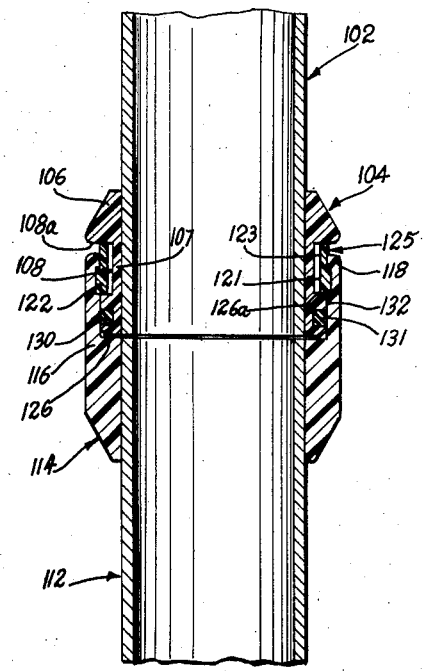
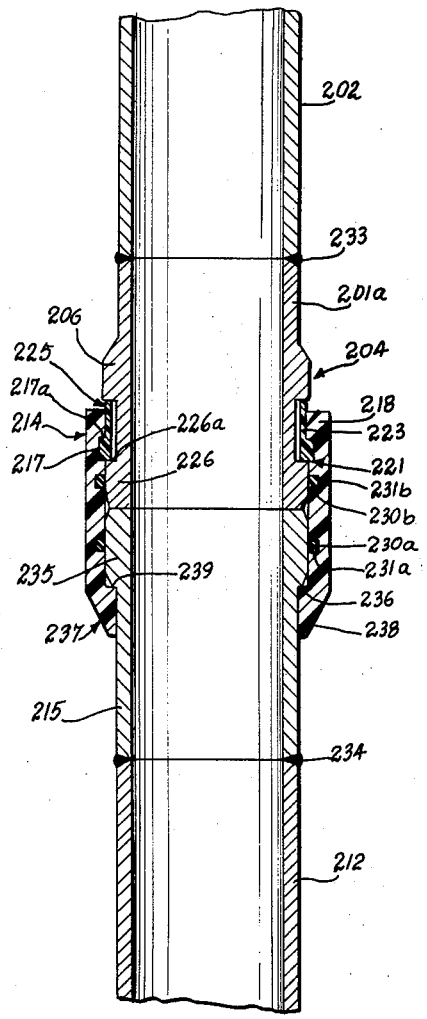
INVENTOR
HORST A.G. PASTERNACK
BY
Michael S. Striker
ATTORNEY … # 3,195,928
COUPLING FOR PIPES AND THE LIKE
Horst A. G. Pasternack, Essen (Ruhr), Germany, assignor to Wasag-Chemie A.G., Essen, Germany
Filed July 5, 1962, Ser. No. 207,754
Claims priority, application Germany, June 7, 1960,
W 27,982; July 5, 1961, W 30,299
14 Claims. (Cl. 285—18)

This is a continuation-in-part of application Serial No. 114,375 filed June 2, 1961, now abandoned.

The present invention relates to couplings in general, and more particularly to a coupling which is capable of providing a readily separable connection between a pair of rods, bars, shafts, conduits, pipes and similar tubular or solid structures.

An important object of the invention is to provide a coupling for detachably connecting a pair of tubular or solid elements in such a way that the coupling cannot be disconnected if one element is rotated with respect to the other element.

Another object of the invention is to provide a coupling of the just outlined characteristics which can form a very strong and highly reliable connection between a pair of end-to-end arranged elements and which is constructed and assembled in such a way that its component parts need not project or project only slightly beyond the outlines of the interconnected elements.

A further object of my invention is to provide a coupling which may be manufactured at a very low cost because its component parts need not be provided with internal or external threads and because it can form a satisfactory connection even if its parts are not machined with utmost precision.

An additional object of the invention is to provide a coupling which is capable of forming a fluidtight seal between a pair of end-to-end arranged tubular fluid-conveying elements.

A concomitant object of the invention is to provide a pipe joint which embodies a coupling of the above outlined characteristics.

A further object of the invention is to provide a pipe joint wherein one pipe may be detachably secured to another pipe in such a way that neither pipe must be moved in axial direction when it becomes necessary to separate the pipes from each other.

An additional object of the invention is to provide a pipe joint which embodies a coupling of the above outlined characteristics and wherein the sealing devices which prevent escape of conveyed fluid may be mounted directly in the component parts of the coupling so that the ends of interconnected pipes need not be formed with grooves, recesses, cutouts and similar cost-increasing configurations.

Still another object of my invention is to provide a coupling which is especially suited for providing a reliable but readily separable connection between explosive-filled cartridges of the type utilized for blasting earth, rock or ore in quarries, mines and other underground or above-ground industrial establishments.

With the above objects in view, the invention resides in the provision of a coupling which comprises a female coupling member having an open end and an internal annular cutout adjacent to its open end, a male coupling member which extends through the open end of and into the interior of the female coupling member, and a normally expanded split ring which serves as a means for retaining the male coupling member in the female coupling member and which permits withdrawal of the male coupling member if it is subjected to radially inwardly directed pressure. The male coupling member comprises an intermediate portion and an annular peripheral recess which is received partially within and which extends partially beyond the open end of the female coupling member, this recess surrounding the intermediate portion of the male coupling member and having a portion which is located inwardly of the cutout in the female coupling member. The split ring is accommodated in the recess and is normally spaced from the intermediate portion of the male coupling member. This ring comprises a first annular portion which normally extends into the cutout to retain the male coupling member in the female coupling member, and a second portion which extends beyond the open end of the female coupling member and which may be deformed radially inwardly toward the intermediate portion of the male coupling member to withdraw the first annular portion from the cutout and to thus permit withdrawal of the male coupling member.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a fragmentary axial section through an explosive-filled cartridge provided with a male coupling member constituting a component part of a coupling which embodies one form of my invention;

FIG. 2 is a similar fragmentary axial section through another cartridge which is provided with a female coupling member constituting another component part of the coupling;

FIG. 3 is a partly elevational and partly sectional view of a specially constructed split ring which is adapted to provide a separable connection between the coupling members;

FIG. 4 is an axial section through the assembled coupling, showing the split ring of FIG. 3 in expanded position in which the ring prevents withdrawal of the male coupling member from the female coupling member;

FIG. 5 is a transverse section as seen in the direction of arrows from the line V—V of FIG. 4, showing the manner in which the split ring may be compressed by means of a flexible element to permit withdrawal of the male coupling member from the female coupling member;

FIG. 6 is an axial section through a pipe joint which embodies a slightly modified coupling and wherein the male coupling member accommodates a packing adapted to provide a fluidtight seal between the coupling members when the coupling is assembled; and FIG. 7 is an axial section through a pipe joint which constitutes a slight modification of the structure shown in FIG. 6 and wherein the female coupling member forms part of an axially movable sleeve.

Referring now in greater detail to the illustrated embodiments, and first to FIGS. 1 to 5, there is shown a coupling which is utilized for connecting two explosive-filled cartridges in end-to-end relation. FIG. 1 shows the first cartridge 1 which comprises a pipe-like case or shell 2 containing an explosive charge 3. The open-ended terminal section 1a of the case 2 receives an external annular flange 6 provided at the rear end of a hollow tubular male coupling member 4, and this coupling member is press-fitted (as at 5), bolted, welded, soldered or otherwise rigidly secured to the case 2. The front end of the coupling member 4 is closed by a wall 9, and it will be noted that this coupling member accommodates some of the charge 3. Adjacent to the wall 9, there is provided on the coupling member 4 a second external annular flange 26 having an annular shoulder 26a which faces the annular shoulder 8a of the flange 6. The flanges 6, 26 and an annular intermediate portion 7 of the male coupling member 4 define between themselves an external annular recess 8 which extends between the shoulders 8a, 26a and which surrounds the intermediate portion 7.

FIG. 2 shows the second cartridge 11 which comprises a case or shell 12 for an explosive charge 13, and the terminal section 15 of the case 12 accommodates a socket-shaped female coupling member 14 which is provided with an open outer end surrounded by the open end of the terminal section 15. The other or inner end of the female coupling member 14 is closed by a wall 19. This coupling member comprises a pair of internal annular collars 16, 18 which define between themselves an internal annular cutout 17, the latter extending between an annular shoulder 17a of the collar 18 which faces away from the open end of the coupling member 14, and an annular shoulder 16a of the other collar 16 which faces the open end of the female coupling member. The collar 18 is provided with a conical face 18a which flares outwardly toward the open end of the coupling member 14, and this conical face 18a serves as a means for automatically centering the flange 26 when the male coupling member 4 is introduced through the open end of the female coupling member to assume a position as shown in FIG. 4 in which the walls 9, 19 are in actual abutment with or very close to each other. The shoulder 26a of the flange 26 is then located inwardly of the shoulder 17a and faces the open end of the coupling member 14. It will be noted that the outer diameter of the shoulder 26a is smaller than the inner diameters of the shoulders 16a, 17a so that the male coupling member may be readily inserted into or withdrawn from the female coupling member.

The coupling further comprises a split ring 21 which is shown in FIG. 3 and which is provided with an axially parallel slit 24. This ring consists of elastically deformable material and is normally expanded so that the width of its slit 24 assumes a predetermined magnitude unless the ring is compressed radially inwardly during insertion or withdrawal from the female coupling member. The ring 21 comprises a first split annular portion 22 having an end face 22a which abuts against the shoulder 26a and against the shoulder 16a of the collar 16 when the coupling is assembled in a manner as shown in FIG. 4, and a second split annular portion 23 whose end face abuts against the shoulder 8a when the ring surrounds the intermediate portion 7 of the male coupling member 4. When the ring 21 is permitted to expand, its inner diameter is smaller than the outer diameter of the shoulder 26a but greater than the outer diameter of the intermediate portion 7, and the outer diameter of the annular portion 22 is then greater than the inner diameter of the shoulder 17a so that the ring can retain the coupling member 4 in the interior of the female coupling member. The thickness of the portion 22 is selected in such a way that this portion does not extend beyond the outline of the shoulder 26a when the ring 21 is compressed into contact with the intermediate portion 7 so that the male coupling member may be withdrawn from the member 14 when the ring 21 is compressed. It will be noted that the portions 22, 23 define between themselves an annular shoulder 22b which abuts against the shoulder 17a when the coupling is assembled.

The axial distance between the shoulders 8a, 26a on the male coupling member 4 exceeds the distance between the open end and the collar 16 of the female coupling member 14. Consequently, when the walls 9, 19 are moved into actual abutment with each other, the shoulder 8a remains spaced from the open end of the member 14 so that the members 4, 14 define an annular gap 25 (see FIG. 4) and partially expose the portion 23. The axial length of the ring 21 is only slightly less than the axial distance between the shoulders 8a, 26a and the axial length of the portion 22 is only slightly less than the axial distance between the collars 16, 18.

The coupling of FIGS. 1 to 5 is assembled as follows:

In the first step, the operator expands the portions 22, 23 beyond their normal expanded position so that the ring 21 may be slipped over the flange 26 and is thereupon accommodated in the recess 8 to surround the intermediate portion 7. The end face 22a is adjacent to the shoulder 26a and the internal surface of the ring 21 is spaced from the intermediate portion 7 so that the portion 22 extends beyond the outlines of the flange 26 as soon as the ring 21 is permitted to reassume its normal expanded position.

In the next step, the flange 26 is introduced through the open end of the female coupling member 14 whereby the conical face 18a causes the ring 21 to contract to such an extent that the annular portion 22 passes through the collar 18 and is received in the annular cutout 17 between the shoulders 16a, 17a as soon as the wall 9 abuts against the wall 19. The ring 21 is now free to expand and the annular portion 22 thereby prevents withdrawal of the male coupling member because the shoulder 22b abuts against the shoulder 17a. At the same time, the end face 22a abuts against the shoulders 16a, 26a so that the ring 21 is held against axial movements with respect to the coupling members.

If it should become necessary to separate the cartridge 1 from the cartridge 11, the operator utilizes a cord or wire 27 (see FIG. 5) or a similar flexible element in order to subject the annular portion 23 to radially inwardly directed pressure and to thereby withdraw the annular portion 22 from the cutout 17. As shown in FIG. 5, the operator inserts the cord 27 into the gap 25 and applies pressure with two fingers (arrows 28 and 29) in order to deform the ring 21 into abutment with the intermediate portion 7 of the coupling member 4. Such deformation of the ring 21 is sufficient to permit withdrawal of the member 4 because the outer diameter of the annular portion 22 is then less than the inner diameter of the collar 18.

The non-illustrative left-hand terminal section of the case 2 preferably accommodates a female coupling member which is identical with the member 14, and the non-illustrated right-hand terminal section of the case 12 preferably receives a male coupling member which is identical with the member 4. By providing each cartridge with a male and with a female coupling member, one can assemble any desired number of cartridges into a composite package which can be utilized in mines, tunnels, quarries and for other purposes when an explosive charge must be placed into a predrilled hole.

Heretofore, explosive-filled cartridges were coupled by providing each end of a cartridge with a solid coupling member one of which was formed with external and the other of which was formed with mating internal threads. A serious drawback of such threaded couplings is that unintentional rotation of one cartridge with respect to the other cartridge may result in separation of the coupling. Moreover, the threaded portions of such coupling members may rust in storage so that it will be difficult, if not impossible, to screw the male coupling member into the female coupling member. Furthermore, many conventional couplings comprise parts which extend radially outwardly beyond the outlines of the cartridges. Consequently, such couplings may become stuck in drilled holes with uneven walls.

Since the coupling of my invention does not utilize externally or internally threaded coupling members, and since this coupling utilizes a split ring which can be readily compressed to permit separation of the coupling members, such coupling members may be readily connected or separated even if their surfaces are not finished with utmost precision and even if their surfaces are covered with rust. In addition, since the male coupling member is separable from the female coupling member without necessitating rotation of one cartridge with respect to the other cartridge, the likelihood of accidental disconnection is very remote, especially since the diameter of the annular portion 23 of the split ring 21 is smaller than the diameters of the cases 2, 12 so that accidental compression of the split ring and resultant separability of the male coupling member from the female coupling member is just about impossible.

In the embodiment of FIGS. 1 to 5, the component parts of the coupling 4, 14, 21 consist of synthetic plastic material but it will be readily understood that the coupling may be made of metal if desired.

FIG. 6 illustrates a pipe joint which embodies a slightly different coupling adapted to provide a fluidtight connection between a first pipe 102 and a second pipe 112. The open end of the pipe 102 is surrounded by a tubular end section 104 which constitutes a male coupling member and which is provided with a pair of spaced external annular flanges 106, 126 having shoulders 108a, 126a and defining an annular recess 108 for a normally expanded split ring 121 which surrounds an intermediate portion 107 of the member 104. The open end of the other pipe 112 is surrounded by a tubular end section 114 which constitutes a female coupling member and which is provided with internal collars 116, 118 defining annular shoulders at opposite axial ends of the split annular portion 122, the latter forming part of the split ring 121. The flange 106 and the collar 118 define between themselves an annular gap 125 which partially exposes the annular portion 123 of the ring 121 so that the ring may be deformed in the same way as described in connection with FIG. 5 in order to permit withdrawal of the male coupling member 104 through the open end of the female coupling member 114.

The flange 126 is provided with an external annular groove 131 for an annular packing here shown as a completely round seamless rubber ring 130 of circular section. This packing is assumed to consist of rubber and sealingly engages the coupling members 104, 114 to provide a fluidtight seal for the pipe joint. Of course, two or more annular packings may be used if necessary. It will be noted that the groove 131 is more distant from the open end of the coupling member 114 than the shoulder 126a so that the packing 130 may form a fluidtight seal at a point close to the open end of the member 104. The peripheral surface 132 of the flange 126 is slidably fitted into the female coupling member to make sure that the packing 130 is compressed when the coupling is assembled.

The manner in which the members 104, 114 and the ring 121 cooperate to form a separable coupling is the same as described in connection with FIGS. 1 to 5.

The pipe joint of FIG. 6 is especially suited for use in conduits for compressed air, oil and similar fluids. The parts of this pipe joint consist of metallic material, and the packing 130 may resist pressures of up to 300 atmospheres absolute pressure.

Referring finally to FIG. 7, there is shown a slightly modified pipe joint whose pipes 202, 212 are provided with coaxial tubular terminal sections or extensions 201a, 215. The extension 201a is welded to the open end of the pipe 202 by an annular seam 233, and a similar seam 234 connects the extension 215 with the open end of the pipe 212. At its open end, the extension 215 is provided with an external annular abutment means or flange 235 defining an annular stop face or shoulder 236 which is turned away from the open end of this extension. A sleeve 237 is disposed about and is axially movable along the extension 215 so that the annular face or shoulder 239 of its abutment means (here shown as an internal collar 238) may abut against the face 236. When the face 239 abuts against the face 236, the front portion 214 of the sleeve 237 extends beyond the open end of the extension 215, and this front portion 214 constitutes a female coupling member which is provided with an internal shoulder 217a and with an internal cutout 217 in the same way as described in connection with FIG. 2.

The front portion 204 of the extension 201a constitutes a male coupling member and is provided with external flanges 206, 226 the latter of which has an annular shoulder 226a facing toward the open end of the member 214 when the conpling is assembled.

A split ring 221 cooperates with the coupling members 204, 214 in the same manner as described in connection with FIG. 4, and it will be noted that the smaller-diameter portion 223 of this ring is partially exposed by extending into a gap 225 defined by the collar 218 and flange 206 so that the member 204 may be withdrawn in a manner as shown in FIG. 5.

The sleeve 237 is provided with internal annular grooves 231a, 231b for annular packings 230a, 230b which respectively surround and sealingly engage the flanges 235, 226 to form a pair of fluidtight seals between this sleeve and the extensions 201a, 215. Of course, the sleeve 237 may accommodate three or more packings, if necessary, and it is equally possible to insert such packings into annular grooves provided in the parts 238, 226 in a manner as shown in FIG. 6.

If an operator desires to separate the pipes 202, 212 from each other, he merely compresses the annular portion 223 to withdraw the annular portion 222 from the cutout 217 and thereupon shifts the sleeve 237 in a direction away from the extension 201a so that the open end of the sleeve does not project beyond the extentsion 215. An important advantage of this coupling is that the male coupling member 204 need not be moved with respect to the female coupling member 214 whereby the axial position of the pipes 202, 212 and of their extensions may remain unchanged when the coupling is taken apart. The advantage of such construction of a pipe joint will be readily understood if one considers that the pipes 202, 212 can be extremely heavy and that these pipes may constitute sections of a pipe line so that at least one additional section would have to be removed before one could shift the pipe 202 or 212 in axial direction. However, by using a coupling of the type shown in FIG. 7, the operators may move the pipe 202 or 212 in a direction at right angles to its axis as soon as the sleeve 237 is fully withdrawn onto the extension 215.

It will be noted that the coupling of my invention may be taken apart by compressing, rather than by expanding, the ring 21, 121 or 221. In other words, the ring need not be deformed outwardly and beyond the outlines of the connected elements 2–12, 102–112 or 202–212 which is of considerable advantage (for example, in pipe lines) when there is no room to permit expansion of the split ring. Consequently, the improved coupling may be utilized as a highly advantageous substitute for so-called flanged couplings in which pairs of external flanges are secured to each other by bolts, clamps or the like. Such external flanges cannot be fitted into narrow channels or small-diameter boreholes such as are used in blasting, laying of piping and elsewhere.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A coupling comprising a female coupling member having an open and an internal shoulder which faces away from said open end; a male coupling member extending through said open end and into said female coupling member and having an external shoulder located inwardly of said internal shoulder and facing said open end, said external shoulder having an outer diameter smaller than the inner diameter of said internal shoulder; and a normally expanded split ring surrounding said male coupling member, said ring having a first split annular portion which is located in said female coupling member intermediate said shoulders and an exposed second split annular portion which extends outwardly and beyond said open end, said first portion having an outer diameter greater than the inner diameter of said internal shoulder and an inner diameter smaller than the outer diameter of said external shoulder when the ring is expanded whereby said first portion normally retains said male coupling member in said female coupling member, said ring being compressible in response to application of radially inwardly directed pressure against said second portion thereof so that the outer diameter of said first portion is reduced to less than the inner diameter of said internal shoulder and the ring then permits withdrawal of said male coupling member from said female coupling member, said male coupling member further having an annular external shoulder abutting against said exposed second annular portion of said ring and extending radially at least to the outer periphery of said second annular portion so that the likelihood of accidental compression of said ring is substantially reduced.

2. A pipe joint comprising a first and a second pipe each having a terminal section, one of said sections having an open end and an internal annular shoulder facing away from said open end, the other of said sections extending through said open end and into said one section and having an external annular shoulder located inwardly of said internal shoulder and facing said open end, said external shoulder having an outer diameter smaller than the inner diameter of said internal shoulder; and a normally expanded split ring surrounding said other section, said ring having a first split annular portion which is located in said one section intermediate said shoulders and an exposed second split annular portion which extends outwardly and beyond said open end, said first portion having an outer diameter greater than the inner diameter of said internal shoulder and an inner diameter smaller than the outer diameter of said external shoulder when the ring is expanded whereby said first portion normally retains said other section in said one section, said ring being compressible in response to applications of radially inwardly directed pressure against said second portion thereof so that the outer diameter of said first portion is reduced to less than the inner diameter of said internal shoulder and the ring then permits withdrawal of said other section from said one section, said other section further having an external annular shoulder abutting against said exposed second annular portion of said ring and extending radially at least to the outer periphery of said second annular portion so that the likelihood of accidental compression of said ring is substantially reduced.

3. A pipe joint comprising a first pipe having an open end and a tubular end section which surrounds and which is secured to said open end, said end section having a portion which constitutes a female coupling member and which extends beyond said open end, said female coupling member having an open end spaced from said first mentioned open end and an internal annular shoulder facing away from said open end thereof; a second pipe having an open end and a tubular end section which surrounds and which is secured to said last mentioned open end, said last mentioned end section having a portion which constitutes a male coupling member and which extends through the open end and into the interior of said female coupling member, said male coupling member having an external annular shoulder located inwardly of said internal shoulder and facing the open end of said female coupling member, said external shoulder having an outer diameter smaller than the inner diameter of said internal shoulder; and a normally expanded split ring surrounding said male coupling member, said ring having a first split annular portion which is located in said female coupling member intermediate said shoulders and an exposed second split annular portion which extends outwardly and beyond the open end of said female coupling member, said first portion having an outer diameter greater than the inner diameter of said internal shoulder and an inner diameter smaller than the outer diameter of said external shoulder when the ring is expanded whereby said first portion normally retains said male coupling member in said female coupling member, said ring being compressible in response to application of radially inwardly directed pressure against said second portion thereof so that the outer diameter of said first portion is reduced to less than the inner diameter of said internal shoulder and the ring then permits withdrawal of said male coupling member from said female coupling member, said male coupling member further having an annular external shoulder abutting against said exposed second annular portion of said ring and extending radially at least to the outer periphery of said second annular portion so that the likelihood of accidental compression of said ring is substantially reduced.

4. A pipe joint comprising a first pipe having an open end and an external collar adjacent to said open end, said collar having an external annular shoulder facing away from said open end; a sleeve axially movably surrounding said first pipe and having an internal annular shoulder abutting against said external shoulder, said sleeve having a portion constituting a female coupling member which surrounds said collar and which extends beyond said open end, said female coupling member having an open and spaced from said first mentioned open end when said shoulders abut against each other and an internal annular shoulder element facing away from the open end thereof; a second pipe having an open end adjacent to the open end of said first pipe; a second sleeve surrounding and secured to the open end of said second pipe, said second sleeve constituting a male coupling member and extending through the open end of and into said female coupling member, said male coupling member having an external annular shoulder element located inwardly of said internal shoulder element and facing the open end of said female coupling member, said external shoulder element having an outer diameter which is smaller than the inner diameter of said internal shoulder element; and a normally expanded split ring surrounding said male coupling member, said split ring having a first split annular portion which is located in said female coupling member intermediate said shoulder elements and an exposed second split annular portion which extends outwardly and beyond the open end of said female coupling member, said first portion having an outer diameter greater than the inner diameter of said internal shoulder element and an outer diameter smaller than the outer diameter of said external shoulder element when the ring is expanded whereby said first portion normally retains said male coupling member in said female coupling member, said ring being compressible in response to application of radially inwardly directed pressure against said second portion thereof so that the outer diameter of said first portion is reduced to less than the inner diameter of said internal shoulder element and the ring then permits axial movement of said sleeve in a direction away from said second pipe so as to release said male coupling member from said female coupling member, said male coupling member further having an annular external shoulder abutting against said exposed second annular portion of said ring and extending radially at least to the outer periphery of said second annular portion so that the likelihood of accidental compression of said ring is substantially reduced.

5. A coupling comprising a female coupling member having an open end, an internal shoulder which faces away from said open end, and an internal annular groove inwardly spaced from said shoulder; a male coupling member extending through said open end and into said female coupling member and having an external shoulder located inwardly of said internal shoulder but outwardly of said groove and facing said open end, said external shoulder having an outer diameter smaller than the inner diameter of said internal shoulder; annular packing means received in said groove and sealingly engaging said members; and a normally expanded split ring surrounding said male coupling member, said ring having a first split annular portion which is located in said female coupling member intermediate said shoulders and an exposed second split annular portion which extends outwardly and beyond said open end, said first portion having an outer diameter greater than the inner diameter of said internal shoulder and an inner diameter smaller than the outer diameter of said external shoulder when the ring is expanded whereby said first portion normally retains said male coupling member in said female coupling member, said ring being compressible in response to application of radially inwardly directed pressure against said second portion thereof so that the outer diameter of said first portion is reduced to less than the inner diameter of said internal shoulder and the ring then permits withdrawal of said male coupling member from said female coupling member, said male coupling member further having an annular external shoulder abutting against said exposed second annular portion of said ring and extending radially at least to the outer periphery of said second annular portion so that the likelihood of accidental compression of said ring is substantially reduced.

6. A coupling comprising a female coupling member having an open end and an internal shoulder which faces away from said open end; a male coupling member extending through said open end and into said female coupling member and having an external shoulder located inwardly of said internal shoulder and facing said open end, said external shoulder having an outer diameter smaller than the inner diameter of said internal shoulder, said male coupling member provided with an external annular groove; annular packing means received in said groove and sealingly engaging said members; and a normally expanded split ring surrounding said male coupling member, said ring having a first split annular portion which is located in said female coupling member intermediate said shoulders and an exposed second spilt annular portion which extends outwardly and beyond said open end, said first portion having an outer diameter greater than the inner diameter of said internal shoulder and an inner diameter smaller than the outer diameter of said external shoulder when the ring is expanded whereby said first portion normally retains said male coupling member in said female coupling member, said ring being compressible in response to application of radially inwardly directed pressure against said second portion thereof so that the outer diameter of said first portion is reduced to less than the inner diameter of said internal shoulder and the ring then permits withdrawal of said male coupling member from said female coupling member, said male coupling member further having an annular external shoulder abutting against said exposed second annular portion of said ring and extending radially at least to the outer periphery of said second annular portion so that the likelihood of accidental compression of said ring is substantially reduced.

7. A pipe joint comprising a first pipe having an open end; a first tubular extension coaxial with and welded to the open end of said pipe, said extension having an open end and external abutment means provided with a face which is turned away from the open end of said extension; a tubular sleeve surrounding and axially slidable along said extension, said sleeve having internal abutment means provided with a face abutting against said first mentioned face and a tubular portion extending beyond the open end of said extension when said faces abut against each other, said tubular portion constituting a female coupling member and having an open end spaced from the open end of said extension and an internal annular shoulder facing away from the open end thereof; a second pipe having an open end; a second tubular extension coaxial with and welded to the open end of said second pipe, said second extension constituting a male coupling member having an open end and an external annular shoulder facing away from said open end, said male coupling member extending through the open end of and into said female coupling member so that said external shoulder is located inwardly of said internal shoulder, said external shoulder having an outer diameter which is smaller than the inner diameter of said internal shoulder; and a normally expanded split ring surrounding said male coupling member, said ring comprising a first split annular portion which is located in said female coupling member intermediate said shoulders and an exposed second split annular portion which extends outwardly and beyond the open end of said female coupling member, said first annular portion having an outer diameter greater than the inner diameter of said internal shoulder and an inner diameter smaller than the outer diameter of said external shoulder when the ring is expanded whereby said first annular portion normally retains said male coupling member in said female coupling member, said ring being compressible in response to application of radially inwardly directed pressure against said second annular portion thereof so that the outer diameter of said first annular portion is reduced to less than the inner diameter of said internal shoulder and the ring then permits withdrawal of said male coupling member from said female coupling member, said male coupling member further having an annular external shoulder abutting against said exposed second annular portion of said ring and extending radially at least to the outer periphery of said second annular portion so that the likelihood of accidental compression of said ring is substantially reduced.

8. A pipe joint as set forth in claim 7, wherein said sleeve is provided with at least one internal annular groove surrounding one of said extensions, and further comprising annular packing means received in said groove, said packing means sealingly engaging said one extension and said sleeve.

9. A pipe joint as set forth in claim 7, wherein said sleeve is provided with at least one first and at least one second internal annular groove, said first and second grooves respectively surrounding said first and second extensions, and further comprising annular packing means received in said grooves, said packing means sealingly engaging said sleeve and the respective extensions.

10. A coupling comprising a female coupling member having an open end and an internal annular cutout adjacent to said open end; a male coupling member extending through said open end and into said female coupling member and having an intermediate portion and an annular peripheral recess received partially within and extending partially beyond the open end of said female coupling member, said recess surrounding said intermediate portion and having a portion located opposite said cutout; and a normally expanded split ring received in said recess, said ring having a first annular portion normally extending into said cutout to retain said male coupling member in said female coupling member and a second portion extending beyond the open end of said female coupling member, said ring being normally spaced from and being deformable radially inwardly toward said intermediate portion in response to pressure applied against said second annular portion thereof so that said first annular portion is withdrawn from said cutout to permit withdrawal of said male coupling member from said female coupling member, said male coupling member having an annular shoulder in said recess spaced from the end of and defining with said female coupling member an annular gap, said shoulder extending radially outwardly at least to the periphery of said second portion of said ring, said annular gap being only wide enough to permit a thin flexible element, such as a wire or the like, to be placed around said second portion of said ring and into said gap for applying pressure to said ring when desired, said gap being sufficiently narrow to prevent accidental application of pressure.

11. A coupling as set forth in claim 10, wherein the axial length of said ring is slightly less than the axial length of said recess and wherein the axial length of said first annular portion is slightly less than the axial length of said cutout.

12. A coupling as set forth in claim 10, wherein said female coupling member has an internal conical face adjacent to and flaring outwardly toward said open end so that said ring is automatically deformed when said male coupling member is introduced through said open end.

13. A coupling as set forth in claim 10, wherein said ring and said coupling members consist of synthetic plastic material.

14. A coupling as set forth in claim 10, wherein said ring and said coupling members consist of metallic material.

References Cited by the Examiner

UNITED STATES PATENTS

| | | | |
|---|---|---|---|
| 1,217,804 | 2/17 | Metzger | 285—415 |
| 2,441,344 | 5/48 | Bosworth | 285—347 X |
| 2,590,671 | 3/52 | Baker | 102—24 |
| 2,952,480 | 9/60 | Prill et al. | 285—321 X |
| 3,113,792 | 12/63 | Brown | 285—415 X |

FOREIGN PATENTS 447,603   3/48   Canada.

SAMUEL FEINBERG, *Primary Examiner.*